(12) United States Patent
Taneda et al.

(10) Patent No.: US 7,837,202 B2
(45) Date of Patent: Nov. 23, 2010

(54) STABILIZER CONTROL DEVICE

(75) Inventors: Akiya Taneda, Anjo (JP); Ken Ogue, Obu (JP); Toshiyuki Sakai, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 123 days.

(21) Appl. No.: 11/979,933

(22) Filed: Nov. 9, 2007

(65) Prior Publication Data

US 2008/0111326 A1 May 15, 2008

(30) Foreign Application Priority Data

Nov. 9, 2006 (JP) .............................. 2006-304402

(51) Int. Cl.
*B60G 21/00* (2006.01)
*B60G 21/10* (2006.01)

(52) U.S. Cl. .............. 280/5.511; 280/5.502; 280/5.506; 280/124.106; 280/124.107; 280/124.13; 280/124.152

(58) Field of Classification Search .............. 280/5.502, 280/5.506, 5.511, 124.106, 124.107, 124.13, 280/124.152

See application file for complete search history.

(56) References Cited

U.S. PATENT DOCUMENTS

| 6,425,585 B1 | 7/2002 | Schuelke et al. |
| 2006/0049601 A1* | 3/2006 | Matsumoto .......... 280/124.106 |
| 2007/0018414 A1 | 1/2007 | Yasui et al. |
| 2007/0108707 A1* | 5/2007 | Kobayashi ............... 280/5.511 |
| 2009/0091093 A1* | 4/2009 | Urababa et al. .......... 280/5.511 |

FOREIGN PATENT DOCUMENTS

| JP | 2000-289427 A | 10/2000 |
| JP | 2001-260625 A | 9/2001 |
| JP | 2002-518245 A | 6/2002 |

(Continued)

OTHER PUBLICATIONS

"Principles of the Harmonic Drive Mechanism", retrieved from the internet: URL:http://www.hds.co.jp/principle/index.html.

(Continued)

*Primary Examiner*—Paul N. Dickson
*Assistant Examiner*—Barry Gooden, Jr.
(74) *Attorney, Agent, or Firm*—Buchanan Ingersoll & Rooney PC (57) ABSTRACT

A stabilizer control device for a vehicle includes a first and second stabilizer bars, a housing fixed to an end portion of the second stabilizer bar so as to arrange an end portion of the first stabilizer bar adjacent to the end portion of the second stabilizer bar, a rotational torque reducing mechanism having an input portion fixed to the first stabilizer bar and the housing and reducing a relative rotational torque between the housing and the first stabilizer bar and outputting, a hollow member including the first stabilizer bar so as to rotatably support the first stabilizer bar within the housing and fixed with an output portion of the rotational torque reducing mechanism so as to rotatably support the output portion within the housing, and a clutch mechanism arranged between the hollow member and the housing for engaging and disengaging therebetween.

6 Claims, 5 Drawing Sheets

FOREIGN PATENT DOCUMENTS

| | | |
|---|---|---|
| JP | 2004-314947 A | 11/2004 |
| JP | 2005-271828 A | 10/2005 |
| JP | 2007-38893 A | 2/2007 |

OTHER PUBLICATIONS

"Theory and Design Calculation Method of Planetary Gears and Differential Gears", Muneharu Morozumi, Nikkan Kogyo Shimbun Ltd., Published Apr. 27, 1989, 1st printing, pp. 25-29.

* cited by examiner

STABILIZER CONTROL DEVICE

CROSS REFERENCE TO RELATED APPLICATIONS

This application is based on and claims priority under 35 U.S.C. §119 to Japanese Patent Application 2006-304402, filed on Nov. 9, 2006, the entire content of which is incorporated herein by reference.

FIELD OF THE INVENTION

The present invention relates to a stabilizer control device for a vehicle. More specially, the present invention pertains to a stabilizer control device for connecting and disconnecting a pair of stabilizer bars arranged between right and left wheels.

BACKGROUND

A stabilizer control device for a vehicle is generally configured to reduce or control rolling movement of a vehicle body by externally applying an appropriate roll moment to the vehicle body by use of the actuation of stabilizer bars while the vehicle is turning. In order to implement such roll stabilizing function, for example, a roll stabilizer for a vehicle described in JP 2002-518245A (hereinafter referred to as Patent Document 1) includes halved stabilizer bars and a turning electromechanical actuator provided between the halved stabilizer bars. Further, an electric motor (motor) and a speed reducing gear mechanism are arranged between the halved stabilizer bars.

In the roll stabilizer according to the Patent Document 1, it is unavoidable for the actuator to have a large size as a whole. Accordingly, a stabilizer control device described in JP 2004-314947A (hereinafter referred to as Patent Document 2) includes an actuator downsized for controlling torsion force of a stabilizer and fully enlarging a single torsion force from a pair of stabilizer bars, and therefore having the minimized size and weight as a whole. Moreover, another type of a stabilizer control device is provided in JP 2005-271828A (hereinafter referred to as Patent Document 3). For example, when the vehicle is running straight ahead on extremely unsteady roads such as rough or bumpy roads even with the electric motor described in the Patent Document 1 switched off for the purpose of stopping the roll stabilizing function, ride quality may be deteriorated by sudden inputs added to the speed reducing gear mechanism from the stabilizer. However, the stabilizer control device according to the Patent Document 3 further includes a clutch mechanism serving as engaging and disengaging device for switching positions of the stabilizer bars from a free position and an engaged position and vice versa, therefore securing a better ride quality without influence on an actuator due to variations of road conditions or the like.

The speed reduction gear mechanism applied in Patent Documents 1 to 3 is known as a general multi-stage planetary gear mechanism. Specially, a known gearing mechanism, which obtains a large gear ratio, is referred to as a harmonic drive gear mechanism (Harmonic Drive.RTM registered by Harmonic Drive System, Inc.) disclosed in the following non-patent document "Principles of the Harmonic Drive Mechanism", retrieved from the Internet: URL: http://www.hds.cojp/principle/index.html (herein after referred to as Non-patent Document 1). Another known speed reducing mechanism is a paradox planetary gear mechanism. The paradox planetary gear mechanism (a static sun gear and a rotational sun gear) is a planetary gear mechanism in which a pair of internal sun gears with different number of gear teeth is engaged with common planetary gears, for example, as disclosed in the following non-patent document "Theory and Design Calculation Method of Planetary Gears and Differential Gears", Muneharu Morozumi, Nikkan Kogyo Shimbun, Ltd., Published Apr. 27, 1989, $1^{st}$ edition, $1^{st}$ printing, 25-29 (hereinafter referred to as Non-patent Document 2).

Meanwhile, a stabilizer disclosed in JP 2001-260625A (hereinafter referred to as Patent Document 4) includes a viscous coupling arranged between halved right left torsion bars for preventing sudden motional variations of a vehicle while the vehicle is turning so as not to waste suspension strokes of the vehicle. The stabilizer further includes an egageable or disengageable clutch mechanism provided between an outer rotor of the viscous coupling and the right torsion bar for rotating an inner rotor of the viscous coupling. Furthermore, as explained in the Patent Document 4, the viscous coupling includes an operation chamber provided between the outer and inner rotors and filled with viscous fluid, a plurality of inner plates respectively formed in the operation chamber so as to have a predetermined distance from each other in an axial direction while being integrally connected to the inner rotor so as to rotate, and a plurality of outer plates respectively formed in the operation chamber so as to have a predetermined distance from each other in an axial direction while being integrally connected to the outer rotor so as to rotate, wherein shear resistance of the viscous-fluid occurs in the operation chamber in accordance with relative rotations of the inner and outer plates.

The stabilizer control device disclosed in the foregoing Patent Documents 1 to 3 includes the actuator based on an active drive control by the motor. The actuator is connected to the pair of stabilizers via the motor and the speed reducing mechanism so as to add torsion forces to the stabilizer bars. On the other hand, the stabilizer control device disclosed in the foregoing Patent Document 4 is not equipped with a motor and based on a passive drive control by the clutch mechanism. However, for example, in the stabilizer control device according to the Patent Document 4, when the clutch mechanism is configured to be arranged between the pair of stabilizer bars in such a way to be directly connected to the stabilizer bars, a large load is added to the clutch mechanism. Accordingly, an extremely large-size clutch mechanism is required in order to resist the added load, thereby requiring a large-size actuator. Especially, since an end portion of the stabilizer bar must be fixed to a suspension member during installation, the large-size actuator has a disadvantage of installation flexibility due to limitations of space.

In addition, as described in Patent Document 3, the clutch mechanism is connected to the speed reducing mechanism provided in the stabilizer control device where the pair of stabilizer bars is connected via the motor and the speed reducing mechanism. The clutch mechanism is provided in the stabilizer control device and therein connects and disconnects the pair of the stabilizer bars. The clutch mechanism may be downsized but is not applied to the stabilizer control device described in the Patent Document 4.

A need thus exists for a stabilizer control device, which is not susceptible to the drawback mentioned above.

SUMMARY OF THE INVENTION

According to an aspect of the present invention, a stabilizer control device includes a first stabilizer bar connected to one of right and left wheels, a second stabilizer bar connected to the other one of the right and left wheels, a housing fixed to an end portion of the second stabilizer bar so as to arrange an end portion of the first stabilizer bar adjacent to the end portion of the second stabilizer bar and to accommodate the end portion of the first stabilizer bar, a rotational torque reducing mechanism having an input portion fixed to the first stabilizer bar and the housing and reducing a relative rotational torque between the housing and the first stabilizer bar so as to output the relative rotational torque, a hollow member accommodating therein the first stabilizer bar so as to rotatably support the first stabilizer bar within the housing and fixed with an output portion of the rotational torque reducing mechanism so as to rotatably support the output portion within the housing; and a clutch mechanism arranged between the hollow member and the housing for engaging the hollow member and the housing with each other and disengaging from each other, wherein the first and second stabilizer bars are connected and disconnected.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of a stabilizer control device for a vehicle according to the present invention will be explained with reference to the illustrations of the drawing figures as follows.

Figure 1:
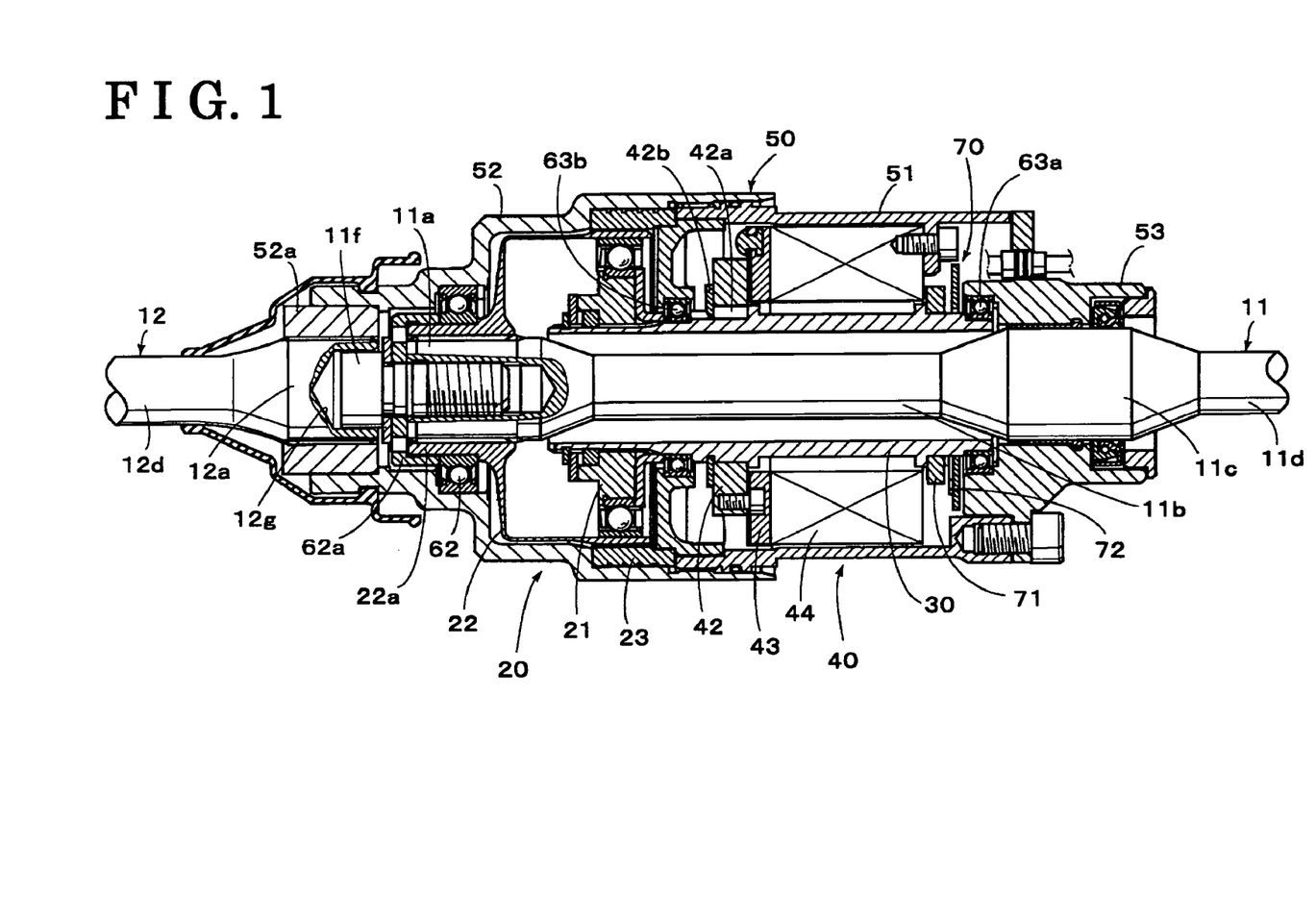
FIG. 1 illustrates a cross-sectional view of a stabilizer control device according to a first embodiment of the present invention.
Figure 5:
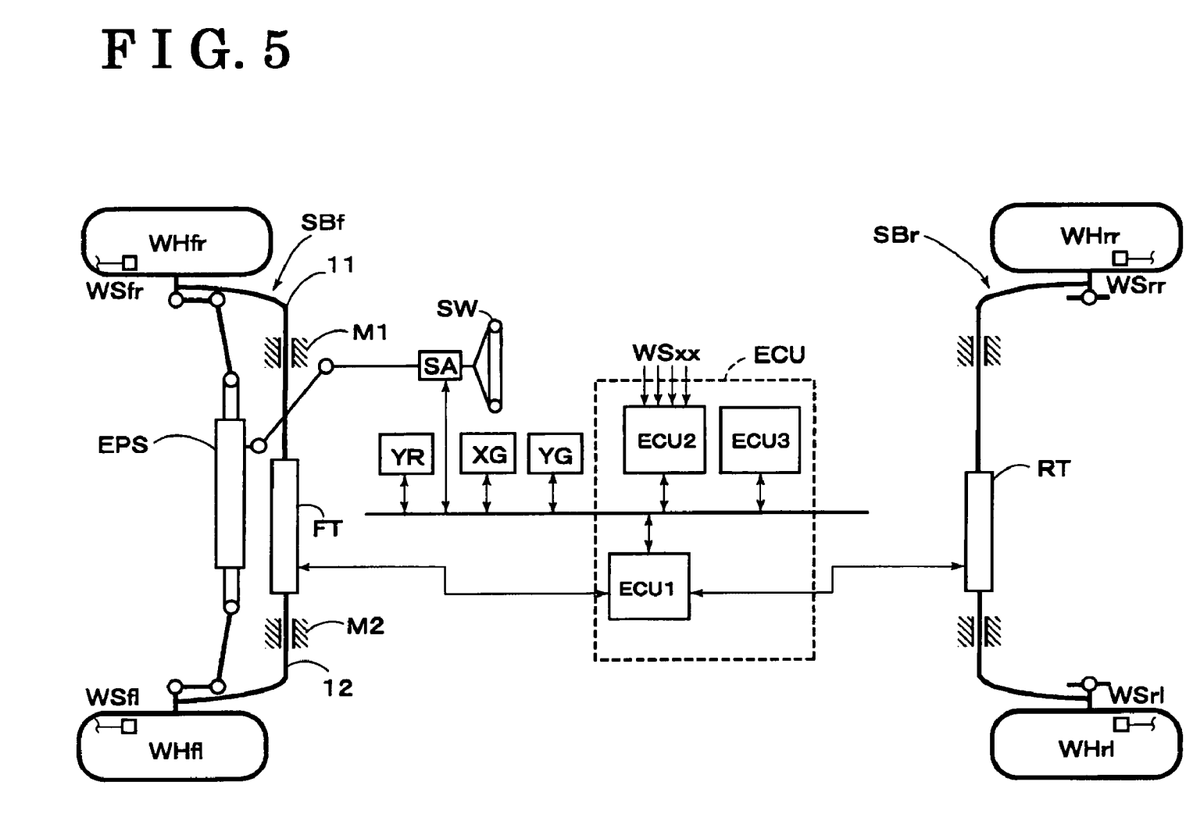
FIG. 5 is a configuration diagram illustrating an overview of a vehicle equipped with the stabilizer control device according to the first embodiment of the present invention.

FIG. 1 illustrates a stabilizer control device for a vehicle according to a first embodiment. FIG. 5 is a configuration diagram illustrating an overview of the vehicle equipped with the stabilizer control device. Firstly, as illustrated in FIG. 5, the stabilizer control device for the vehicle includes a stabilizer SBf for front wheels and a stabilizer SBr for rear wheels, which stabilizers SBf and SBr serve as torsion springs when a rolling motion is inputted to a vehicle body (not shown). The stabilizer SBf for the front wheels are configured in a manner that a stabilizer actuator FT connects and disconnects a transmitting path of a torsion force for controlling the vehicle body roll angle corresponding to the rolling motion of the vehicle. Likewise, the stabilizer SBr for the rear wheels are configured in a manner that a stabiliser actuator RT connects and disconnects a transmitting path of a torsion force for controlling the vehicle body roll angle corresponding to the rolling motion of the vehicle. Hereinafter, the stabilizer actuators FT and RT are referred to as actuators FT and RT, respectively. In addition, the actuators FT and RT are controlled by a stabilizer control unit ECU1 provided in an electronic control unit ECU. The stabilizer SBf for the front wheel (SBr has the same construction) is halved into first and second stabilizer bars 11 and 12. End portions of the first and second stabilizer bars 11 and 12 are respectively connected to right and left wheels WHxx (xx means each wheel such as fr for a right front wheel, f1 for a left front wheel, rr for a right rear wheel, and r1 for a left rear wheel). The other end portions of the first and second stablizer bars 11 and 12 are respectively connected within the actuator FT so as to connect and disconnect each other (further details are described below). Further, retaining members M1 and M2 hold the first and second stabilizer bars 11 and 12 against the vehicle body, respectively.

Each wheel WHxx is provided with a wheel speed sensor WSxx connected to the electronic control unit ECU so that pulse signals with the pulse number proportional to the wheel speed, that is the rotational speed of each wheel, is inputted to the electronic control unit ECU. Furthermore, the electronic control unit ECU is connected to a steering angle sensor SA for detecting a steering angle δ of a steering wheel SW, a longitudinal acceleration sensor XG for detecting the longitudinal acceleration Gx of the vehicle, a lateral acceleration sensor YG for detecting the lateral acceleration Gy, a yaw rate sensor YR for detecting the yaw rate Yr of the vehicle, and or there like.

In addition, the electronic control unit ECU includes a brake control unit ECU2, a steering control unit ECU3, or the like as well as the stabilizer control unit ECU1. The control unit ECUs 1 to 3 are respectively connected to a communication bus via a communication unit including a CPU, a ROM, and a RAM (not shown) for the communication, thereby enabling the information required for each control system to be sent from other control system. For example, as illustrated in FIG. 1, the actuators FT and RT substantively each having the same construction, include a rotational torque reducing mechanism 20 and a clutch mechanism 40 respectively. Engaging and disengaging of the clutch mechanism 40 are controlled by the stabilizer control unit ECU 1.

In FIG. 1, an end portion 12a of the second stabilizer bar 12 is arranged adjacent to an end portion 11a of the first stabilizer bar 11. A housing 52 is fixed to the end portion 12a of the second stabilizer bar 12 to accommodate the end portion 11a of the first stabilizer bar 11. In the first embodiment, the housing 52 is shaped like a container. An overall housing 50 is formed with the housing 52, a tubular housing 51 splined integrally with the open-end portion of the housing 52, and a cover member 53 fixed to the open-end portion of the housing 51. The rotatoinal torque reducing mechanism 20 includes an input portion (22) fixed to the housing 52 and the first stabilizer bar 11 and is configured to reduce a relative rotational torque between the housing 52 and the first stabilizer bar 11. The rotational torque reducing mechanism 20 further includes an output portion (21) and the hollow member 30 is rotatably supported within the housing 51. Moreover, the clutch mechanism 40 is arranged between the hollow member 30 and the housing 51. The clutch mechanism 40 is configured to switch a state between the hollow member 30 and the housing 51 from an engaged state to a disengaged state and vice versa. Each component described above is explained as follows.

Firstly, as illustrated in FIG. 1, the first stabilizer bar 11 includes the end portion 11a having a large diameter, an intermediate portion 11b having a small diameter, an intermediate portion 11c having the large diameter, and a main body 11d having the small diameter. Meanwhile, the second stabilizer bar 12 includes the end portion 12a having the large diameter and a main body 12d having the small diameter. The first and second stabilizer bars 11 and 12 are coaxially arranged with each other so that an end face of the end portion 11a of the first stabilizer bar 11 is arranged adjacent to an end face of the end portion 12a of the second stabilizer bars 12 so as to face the end face of the end portion 12a. The housing 52 is firmly attached with a ring member 52a. The ring member 52a is splined to the end portion 12a of the second stabilizer bar 12. Accordingly, the housing 52 rotates integrally with the second stabilizer bar 12. In addition, according to the first embodiment, a bolt 11f is screwed with the end portion 11a of the first stabilizer bar 11 from the axial end face thereof. A concave portion 12g is formed in the end portion 12a of the second stabilizer bar 12 so as to accommodate a head portion of the bolt 11f.

Secondly, a harmonic drive gear mechanism (Harmonic Drive.RTM registered by Harmonic Drive System, Inc) described in the foregoing Non-patent Document 1 is applied as the rotational torque reducing mechanism 20 in the first embodiment. That is, as illustrated in FIG. 1, a flexible gear 22 is splined to the end portion 11a of the first stabilizer bar 11. A ring gear 23 is fitted into an inner peripheral surface of the open-end portion of the housing 52, thereby integrally connecting each other. In addition, the flexible gear 22 is expressed as "flexpline" in the Non-patent Document 1, which is abbreviated and interpreted as a spline member having flexibility. Also, the ring gear 23 is expressed as "circular spline" in the Non-patent Document 1. A spline connection is generally regarded as an integral connecting method but other connecting methods may be applied. For example, the ring gear 23 may be formed directly on the open-end portion of the housing 52.

As described above, a shaft portion 22a of the flexible gear 22 fixed to the stabilizer bar 11 is rotatably supported relative to the housing 52 via a bearing 62. The bearing 62 is supported by the bolt 11f to the first stabilizer bar 11 via a retainer 62a. Meanwhile, the hollow member 30 is splined with an elliptical gear 21 to be integrated thereto and is operatively associated with the flexible gear 22. Further, the elliptical gear 21 is expressed as "wave generator" in the Non-patent Document 1.

The elliptical gear 21, the flexible gear 22, and the ring gear 23 are respectively described in the foregoing Non-patent Document 1 as follows. The wave generator corresponding to the elliptical gear 21 is a component including a thin ball bearing mounted on the outer peripheral surface of the elliptical cam. An outer ring of the elliptical gear 21 is elastically deformed via the ball. The flexpline corresponding to the flexible gear 22 is a thin cup-shaped elastic metal component with teeth at the outer periphery of the opening portion. Further, the circular spline corresponding to the ring gear 23 is a rigid body ring with internal teeth at the inner periphery. The ring gear 23 has a further two teeth compared to the flexible gear 22. Accordingly, for example, when the wave generator (21) as an input side is driven to rotate, the flexpline (22) having different number of teeth from that of the circular spline (23) rotates relative to the circular spline (23) while engaging with the ring gear 23, thereby reducing speed.

Adversely, when the flexpline (22) is an input side and the wave generator (21) is an output side, a speed is increased and a rotational torque is reduced. Consequently, in this case, the flexpline (22) corresponds to an input portion of the rotational torque reducing mechanism 20 while the wave generator (21) corresponds to an output portion of the rotational torque reducing mechanism 20. In this way, since a motor-driven active control is provided in the foregoing Patent Documents 1 to 3, the harmonic drive gear mechanism is applied as a speed reducing mechanism. Meanwhile, the harmonic drive gear mechanism is applied as a rotational torque reducing mechanism that is a speed-up gear mechanism in the first embodiment.

Next, the clutch mechanism 40 includes a rotating member 42 arranged adjacent to the rotational torque reducing mechanism 20 and fixed to the hollow member 30 and a solenoid 44 (which constructs an electromagnetic drive mechanism 44) for switching a state of a contact member (movable contact) 43 relative to the rotating member 42 from a frictionally engaged state to a disengaged state and vice versa. The solenoid 44 is arranged around the hollow member 30 within the housing 51. The solenoid 44 is fixed to the housing 51 and provided therein so as to be arranged in the opposite side of the rotational torque reducing mechanism 20 relative to the rotating member 42. The rotating member 42 is fitted with the hollow member 30. The rotating member 42 is further fixed to the hollow member 30 so that a key 42a prevents the rotating member 42 from rotating and so that a snap ring 42b prevents the rotating member 42 from moving in an axial direction. In addition, a plate spring (not shown) is placed between the rotating member 42 and the contact member 43. Accordingly, when the solenoid 44 is not excited, a space is formed between the rotating member 42 and the contact member 43, so that the rotating member 42 is not frictionally engaged with the contact member 43 and thereby creating a disengaged state between the rotating member 42 and the contact member 43. When the solenoid 44 is excited, the rotating member 42 is frictionally engaged with the contact member 43. In addition, when the solenoid 44 is excited, the rotating member 42 may be disengaged from the contact member 43. Also, when the solenoid 44 is not excited, the rotating member 42 may be frictionally engaged with the contact member 43.

Furthermore, the hollow member 30 is rotatably supported at both sides of the clutch mechanism 40 within the housing 51. That is, the hollow member 30 is rotatably supported by the housing 50 (the cover member 53) at one end portion thereof via a bearing 63a while being supported by the housing 51 at the other end portion thereof via a bearing 63b. It is preferable for the hollow member 30 to minimize inertia moment. Accordingly, for example, the hollow member 30 is made of aluminum.

Moreover, the housing 51 includes a rotation sensor 70 for detecting a relative rotation between the first and second stabilizer bars 11 and 12. The rotation sensor 70 in the first embodiment includes a magnet 71 fitted into the hollow member 30 and a hall IC 72 disposed in the housing 51 so as to face the magnet 71. Other rotation sensors such as an optical rotary encoder or the like may be used.

Operation of the stabilizer control device having the above-mentioned construction is explained below. When the solenoid 44 in the clutch mechanism 40 is not excited, the rotating member 42 is disengaged from the contact member 43, so that the hollow member 30 is disengaged and separated from the housing 50. Accordingly, the first and second stabilizer bars 11 and 12 are separated from each other, therefore freely rotating respectively. On the other hand, when the solenoid 44 in the clutch mechanism 40 is excited by the stabilizer control unit ECU1, the rotating member 42 is frictionally engaged with the contact member 43, so that the hollow member 30 is connected to the housing 50. That is, the first and second stabilizer bars 11 and 12 are connected to each other via the hollow member 30, the rotational torque reducing mechanism 20, the clutch mechanism 40, and the housing 50. Accordingly, the first and second stabilizer bars 11 and 12 are integrally connected to each other to serve as a stabilizer.

Thus, when the electronic control unit ECU determines that the vehicle is turning based on detection signals of the steering angle sensor SA, the longitudinal acceleration sensor XG, the lateral acceleration sensor YG, the yaw rate sensor YR, or the like, the clutch mechanism 40 is brought into an engaged state. Accordingly a desired torsion force is added by the first and second stabilizer bars 11 and 12. Hereby, the vehicle body roll angle is appropriately controlled, so that the vehicle smoothely turns. Meanwhile, the electronic control unit ECU determines that road surface conditions such as rough or bumpy roads extremely vary (including the time when the vehicle is running straight ahead), the clutch mechanism 40 is brought into a disengaged state, thereby allowing the first and second stabilizer bars 11 and 12 to relatively rotate. Consequently, a better ride quality is maintained.

According to the first embodiment as described above, the clearance between the axial end faces of the first and second stabilizer bars 11 and 12 are extremely small. When the clutch mechanism 40 is at an engaged state, the first and second stabilizer bar 11 and 12 secure an approximately same entire length as that of an integrated stabilizer bar (before being halved), thereby functioning in the same way as the integrated stabilizer. Accordingly, the first and second stabilizer bars 11 and 12 have approximately same outer diameter and weight as those of the integrated stabilizer bar. In addition, the rotational torque reducing mechanism 20 significantly reduces rotational torque. Accordingly, the clutch mechanism 40 does not require a continuous large force and is sufficiently driven by the compact solenoid 44, therefore being downsized in a radial dimension and appropriately arranged between the hollow member 30 and the housing 50. Consequently, the stabilizer control device is further downsized as a whole.

Figure 2:
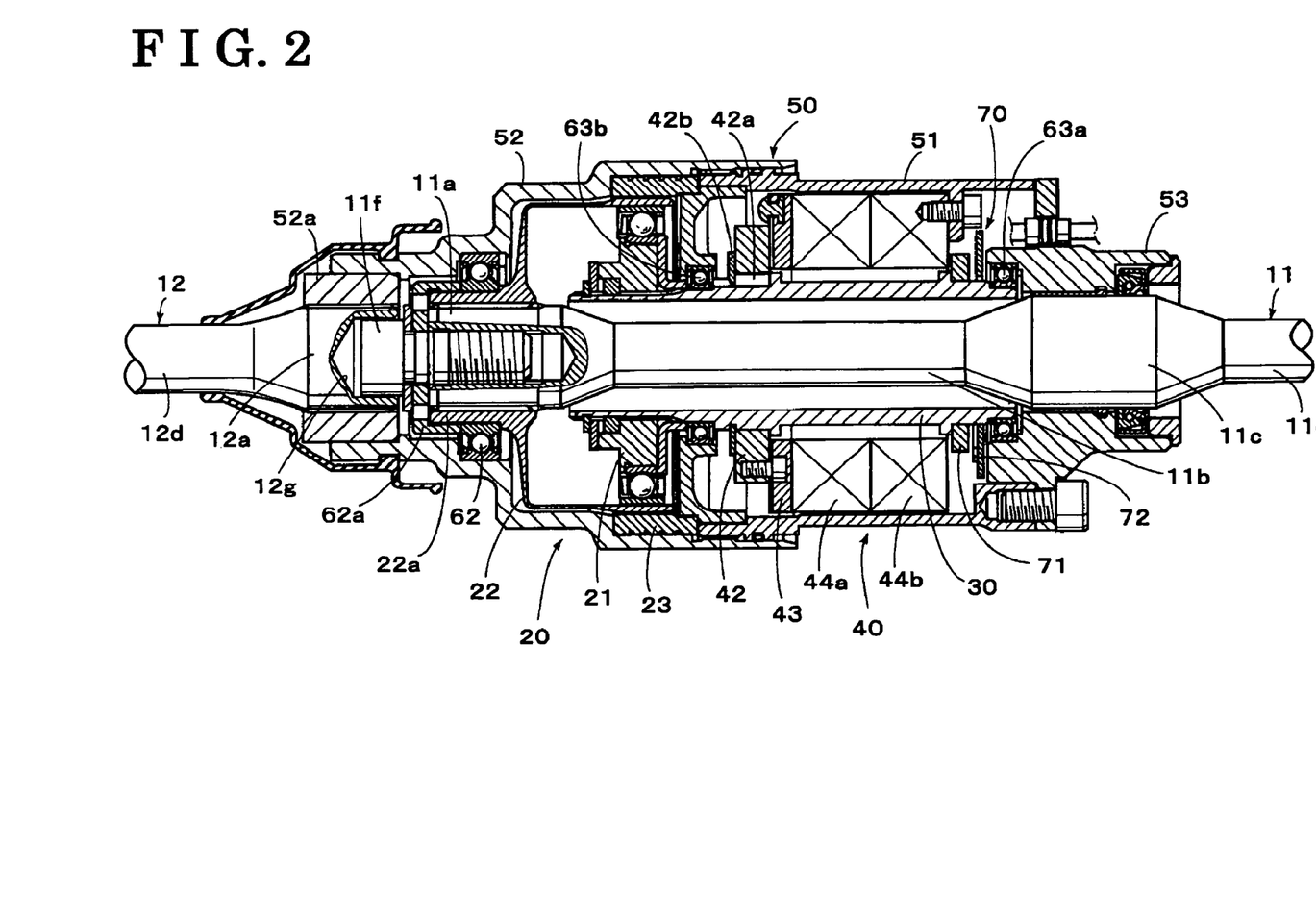
FIG. 2 illustrates a cross-sectional view of a stabilizer control device according a second embodiment of the present invention.

As illustrated in FIG. 2, since a stabilizer control device according to a second embodiment includes a pair of solenoids 44a and 44b in the above-mentioned clutch mechanism 40, other constructions of the second embodiment is the same as that of the first embodiment illustrated in FIG. 1. In case that either one system of the solenoids 44a and 44b fails, such construction of the second embodiment allows the operating condition of the clutch mechanism 40 to be maintained by using either one system thereof, thereby creating redundancy and providing an effective embodiment as a fail safe. Moreover, when the stabilizer control device is configured to alternatively use either one system of the solenoid 44a and 44b or both systems of the solenoid 44a and 44b, connection performance between the solenoids 44a and 44b is adjusted by exciting either one or both of the solenoids 44a and 44b. Accordingly, when both the solenoids 44a and 44b are excited, it is possible to create a condition where a clutch is partially applied, thereby leading to diversification of control.

Figure 3:
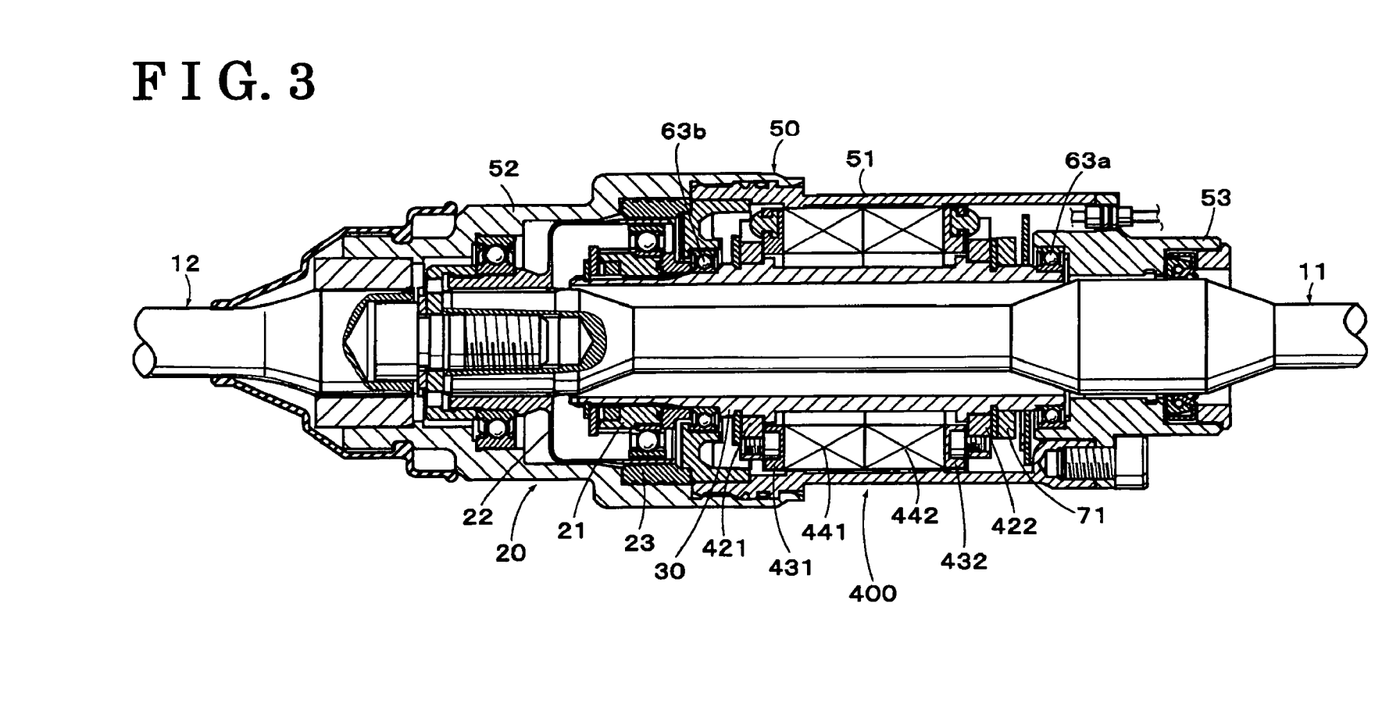
FIG. 3 illustrates a cross-sectional view of a stabilizer control device according to a third embodiment of the present invention.

Next, as illustrated in FIG. 3, a stabilizer control device according to a third embodiment includes a clutch mechanism 400 in which two pairs of the above-mentioned clutch mechanisms 40 are placed side by side. The rotational torque reducing mechanism 20 and other components are the same as those of the first embodiment illustrated in FIG. 1. Accordingly, the components of the third embodiment substantively corresponding to the components of the first embodiment are indicated by the numbers applied in FIG. 1. In FIG. 3, the clutch mechanism 400 includes a first rotating member 421 arranged adjacent to the rotational torque reducing mechanism 20 and fixed to the hollow member 30, a second rotating member 422 fixed to the hollow member 30 and therein arranged so as to have a predetermined distance oppositely from the rotational torque reducing mechanism 20 relative to the first rotating member 421, a solenoid 441 serving as a first electromagnetic drive mechanism 441 for switching a state of a first contact member 431 relative to the first rotating member 421 from a frictionally engaged state to a disengaged state and vice versa, and a solenoid 442 serving as a second electromagnetic drive mechanism 442 for switching a state of a second contact member 432 relative to the second rotating member 422 from a frictionally engaged state to a disengaged state and vice versa. The first and second solenoids 441 and 442 are fixed between the first and second rotating members 421 and 422 within the housing 51. Consequently, the stabilizer control device according to the third embodiment is longer in an axial dimension compared to the first embodiment illustrated in FIG. 1. However, the stabilizer control device of the third embodiment is further minimized in a radial dimension.

In the third embodiment illustrated in FIG. 3, when the solenoids 441 and 442 in the clutch mechanism 400 are not excited, the rotating members 421 is disengaged from the contact member 431 and the rotating member 422 is disengaged from the contact member 432, so that the hollow member 30 and the housing 50 are disengaged and separated from each other. Accordingly, the first and second stabilizer bars 11 and 12 are separated from each other, thereby freely rotating respectively. On the contrary, when the solenoid 441 or the solenoid 442 is excited by the stabilizer control unit ECU1, the rotating member 421 is frictionally engaged with the contact member 431 or the rotating member 422 is frictionally engaged with the contact member 432, so that the hollow member 30 and the housing 50 are connected to each other. Accordingly, the first and second stabilizer bars 11 and 12 are connected to each other via the hollow member 30, the clutch mechanism 400, and the housing 50. Hereby, the first and second stabilizer bars 11 and 12 are integrally connected to each other to serve as a stabilizer.

According to the third embodiment, when both the solenoids 441 and 442 are excited, the rotating member 421 is frictionally engaged with the contact member 431 and the rotating member 422 is frictionally engaged with the contact member 432. In this condition, a larger frictional connection performance is secured, compared to either one of cases where the rotating member 421 is frictionally engaged with the contacting member 431 and where the rotating member 422 is frictionally engaged with the contact member 432. Accordingly, the connection performance between the first and second stabilizer bars 11 and 12 may be adjusted by exciting both the solenoids 441 and 442 and by exciting either the solenoid 441 or the solenoid 442. Consequently, not only connecting and disconnecting operations of the stabilizer control device but also the desired stabilizer control is achieved.

Figure 4:
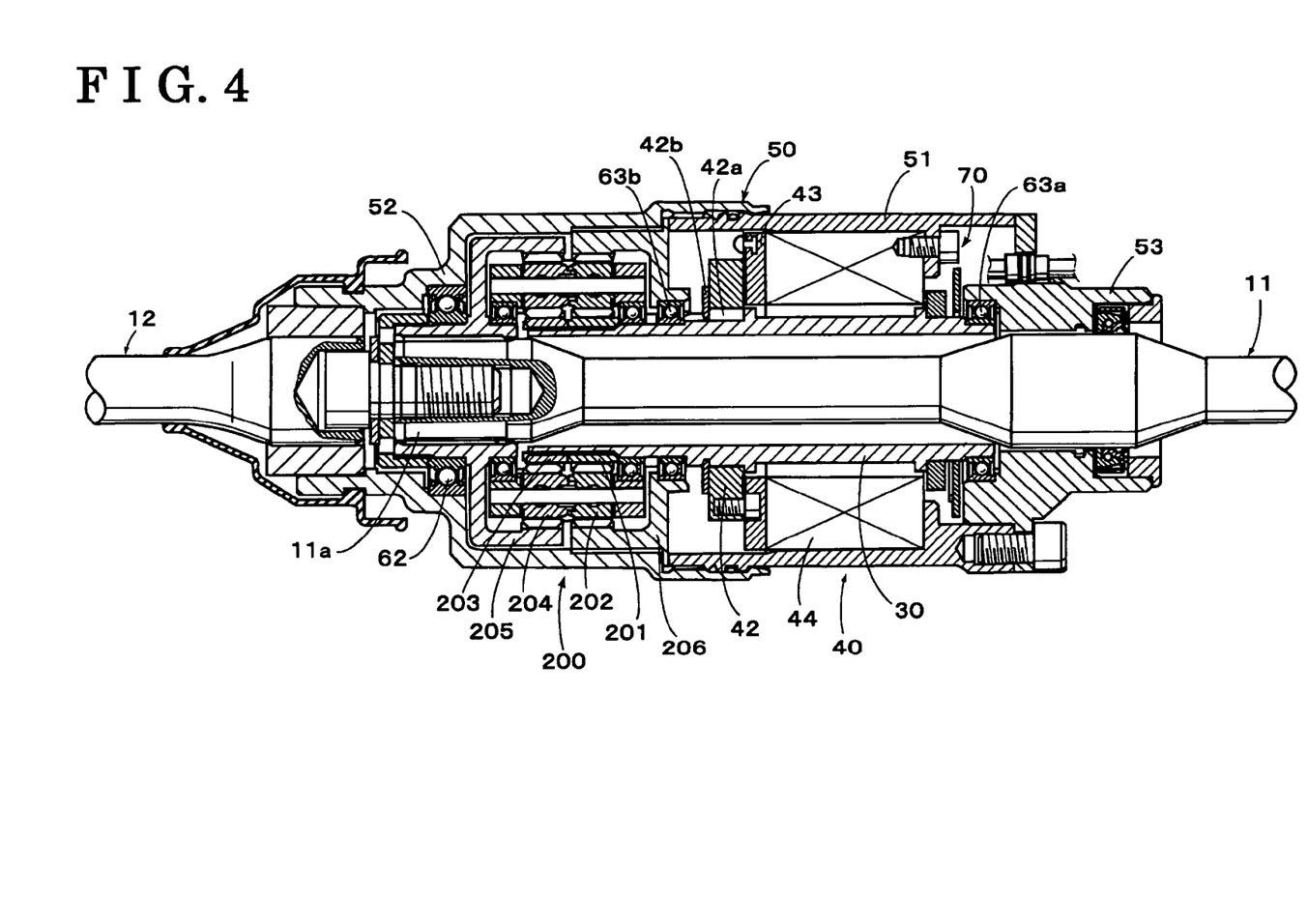
FIG. 4 illustrates a cross-sectional view of a stabilizer control device according to a forth embodiment of the present invention.

As illustrated in FIG. 4, a stabilizer control device according to a forth embodiment includes a paradox planetary gear mechanism 200 serving as the rotational torque reducing mechanism 20. In addition, the clutch mechanism 40 and other components in the forth embodiment are the same as those of the first embodiment illustrated in FIG. 1. Accordingly, the components of the forth embodiment substantively corresponding to the components of the first embodiment are indicated by the numbers applied in FIG. 1.

In the paradox planetary gear mechanism 200, sun gears 201 and 203 are splined to the hollow member 30 (an integrated sun gear of the sun gears 201 and 203 may be applied). A ring gear 205 is integrally splined to the end portion 11a of the first stabilizer bar 11. The ring gear 205 is rotatably supported at an inner surface of the housing 52 via the bearing 62. Furthermore, the first stabilizer bar 11 is rotatably supported at the intermediate portion 11c thereof by the opening portion of the cover member 53. Meanwhile, a ring gear 206 is integrally connected at the inner surface of the housing 52 connected to the second stabilizer bar 12. The number of teeth of the ring gears 205 differs from the number of teeth of the ring gear 206 (for example, the ring gear 205 has sixty teeth while the ring gear 206 has sixty two teeth). A plurality of planetary gears 202 and 204 each having the same number of teeth is supported around the axis of the first stabilizer bar 11 so as to rotate (an integrated planetary gear of the planetary gears 202 and 204 may be applied). Hereby, the paradox planetary gear mechanism 200 is formed. A two-stage planetary gear mechanism is provided in the forth embodiment. That is, the sun gear 201 splined to the hollow member 30 is arranged so as to engage with the first-stage planetary gear (representatively indicated as the planetary gear 202).

The planetary gear 202 is rotatably supported by the sun gear 201 and also supported so as to rotate around the axis of the hollow member 30 (that is the axis of the sun gears 201 and 203). Moreover, as described above, the planetary gear 202 is arranged so as to engage with the sun gear 201 while engaging with the ring gear 206. The planetary gear 202 is supported so as to rotate around the axis of the stabilizer bar 11 while rotating between the sun gear 201 and the ring gear 206. In addition, the second-stage planetary gear (representatively indicated as the planetary gear 204) is arranged so as to engage with the ring gear 205 (and the ring gear 206) while engaging with the sun gear 203. The planetary gear 204 is further supported so as to rotate around the axis of the first stabilizer bar 11 while rotating between the sun gear 203 and the ring gear 205 (and the ring gear 206).

In the forth embodiment illustrated in FIG. 4, when the solenoid 44 in the clutch mechanism 40 is not excited, the rotating member 42 is disengaged from the contact member 43, so that the hollow member 30 is disengaged and separated from the housing 50. Accordingly, the first and second stabilizer bars 11 and 12 are separated from each other, thereby freely rotating respectively. On the contrary, when the solenoid 44 in the clutch mechanism 40 is excited by the stabilizer control unit ECU1, the rotating member 42 is frictionally engaged with the contact member 43, so that the hollow member 30 and the housing 50 are connected to each other. That is, the first and second stabilizer bars 11 and 12 are connected to each other via the hollow member 30, the paradox planetary gear mechanism 200, the clutch mechanism 40, and the housing 50. Hereby, the first and second stabilizer bars 11 and 12 are integrated with each other so as to serve as a stabilizer.

As explained above, the stabilizer control device according to the forth embodiment illustrated in FIG. 4, is activated substantively in the same way as the first embodiment illustrated in FIG. 1. As illustrated in FIG. 4, the clearance between the axial end faces of the first and second stabilizer bars 11 and 12 are extremely small. When the clutch mechanism 40 is in the engaged condition, the first and second stabilizer bars 11 and 12 secure an approximately same entire length as that of an integrated stabilizer bar (before being halved) so as to function in the same way as the integrated stabilizer, therefore having an approximately same outer diameter and weight as those of the integrated stabilizer bar. In addition, the clutch mechanism 40 is appropriately arranged between the hollow member 30 and the housing 50, thereby being downsized in the radial dimension and resulting in the further downsized clutch mechanism 40. Moreover, the clutch mechanism 40 may be constructed as illustrated in FIG. 2 or FIG. 3, thereby increasing more flexibility in designing than the embodiments illustrated from FIGS. 1 to 3.

As explained above, in the stabilizer control device, the clutch mechanism 40 switches a state between the first and second stabilizer bars 11, 12 from a disconnected state allowing a relative rotation between the first and second stabilizer bars 11, 12 to a connected state preventing the relational rotation between the first and second stabilizer bars 11, 12, and vice versa. Hereby, while the vehicle is generally turning, the clutch mechanism 40 is brought into the engaged state, so that the vehicle body roll angle is controlled by the first and second stabilizer bars 11, 12. Hereby, a smooth torque control is achieved. Meanwhile, when road surface conditions such as rough or bumpy roads extremely vary (including the time when the vehicle is running straight ahead), the clutch mechanism 40 is brought into the disengaged state, thereby allowing the relative rotation between the first and second stabilizer bars 11, 12. Accordingly, a better ride quality is maintained. In addition, the clearance between the end faces of the first and second stabilizer bars 11, 12 are extremely small, so that the clutch mechanism 40 is minimized. Consequently, the stabilizer control device is further downsized as a whole without cost increase.

According to another aspect of the present invention, in the above-mentioned stabilizer control device, the hollow member 30 is configured to be rotatably supported at the both sides of the clutch mechanism 40 within the housing 51.

Accordingly, the hollow member 30 is stably supported within the housing 51. Further, it is possible to minimize inertia moment by forming the hollow member 30 of aluminum. Consequently, the stabilizer control device is further downsized as a whole.

According to a further aspect of the present invention, in the above-mentioned stabilizer control device, the clutch mechanism 40 includes a rotating member 42 fixed to the hollow member 30 and arranged adjacent to the rotational torque reducing mechanism 20 and the electromagnetic drive mechanism 44, for frictionally engaging a contact member 43 relative to the rotating member 42 and disengaging the contact member 43 from the rotating member 42, and wherein the electromagnetic drive mechanism 44 is fixed in the housing 51 at an opposite side of the rotational torque reducing mechanism 20 relative to the rotating member 42.

For example, the solenoid 44 arranged around the hollow member 30 within the housing 51 is applied as the electromagnetic drive mechanism 44, thereby further minimizing the stabilizer control device in size and weight as a whole.

Further, according to another aspect of the present invention, in the above-mentioned stabilizer control device, a clutch mechanism 400 includes a first rotating member 421 fixed to the hollow member 30 and arranged adjacent to the rotational torque reducing mechanism 20, a second rotating member 422 fixed to the hollow member 30 so as to be arranged oppositely and with a predetermined distance from the rotational torque reducing mechanism 20 relative to the first rotating member 421, a first electromagnetic drive mechanism 441 for frictionally engaging a first contact member 431 relative to the first rotating member 421 and disengaging the first contact member 431 from the first rotating member 421, and a second electromagnetic drive mechanism 442 for frictionally engaging a second contact member 432 relative to the second rotating member 422 and disengaging the second contact member 432 from the second rotating member 422, and the first and second electromagnetic drive mechanisms 441, 442 are fixed between the first and second rotating members 421, 422 within the housing 51.

Accordingly, radial dimensions of the stabilizer control device are minimized. Further, connection performance between the first and second stabilizer bars 11, 12 is adjusted by driving either one or both of the first and second electromagnetic drive mechanisms 441, 442. Hereby, not only connecting and disconnecting operations of the stabilizer control device but also the desired stabilizer control is achieved.

According to another aspect of the present invention, in the above-mentioned stabilizer control device, the rotational torque reducing mechanism 20 is configured to include a harmonic drive gear mechanism.

Accordingly, the rotational torque reducing mechanism 20 reduces large torque. Hereby, the stabilizer control device is easily minimized in size and weight as a whole.

According to further aspect of the present invention, in the above-mentioned stabilizer control device, the rotational torque reducing mechanism 20 is configured to include a paradox planetary gear mechanism 200.

Accordingly, the rotational torque reducing mechanism 20 reduces large torque. Hereby, the stabilizer control device is easily minimized in size and weight as a whole.

The principles, preferred embodiment and mode of operation of the present invention have been described in the foregoing specification. However, the invention, which is intended to be protected, is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stabilizer control device for a vehicle comprising:
   a first stabilizer bar connected to one of right and left wheels;
   a second stabilizer bar connected to the other one of the right and left wheels;
   a housing fixed to an end portion of the second stabilizer bar so as to arrange an end portion of the first stabilizer bar adjacent to the end portion of the second stabilizer bar and to accommodate the end portion of the first stabilizer bar;
   a rotational torque reducing mechanism serving as a speed-up gear mechanism to rotate an output portion of the rotational torque reducing mechanism at a higher rotational speed than the rotational speed of an input portion of the rotational torque reducing mechanism, the input portion of the rotational torque reducing mechanism being fixed to the first stabilizer bar and the housing and reducing a relative rotational torque between the housing and the first stabilizer bar so as to output the relative rotational torque;
   a hollow member accommodating therein the first stabilizer bar so as to rotatably support the first stabilizer bar within the housing, the hollow member being fixed to the output portion of the rotational torque reducing mechanism so as to rotatably support the output portion within the housing; and
   a clutch mechanism arranged between the hollow member and the housing to be positioned next to the rotational torque reducing mechanism, the clutch mechanism providing selective engagement and disengagement between the hollow member and the housing.

2. The stabilizer control device according to claim 1, wherein the hollow member is rotatably supported at both sides of the clutch mechanism within the housing.

3. The stabilizer control device according to claim 1, wherein the clutch mechanism comprises a rotating member fixed to the hollow member and arranged adjacent to the rotational torque reducing mechanism and an electromagnetic drive mechanism for frictionally engaging a contact member relative to the rotating member and disengaging the contact member from the rotating member, and wherein the electromagnetic drive mechanism is fixed in the housing at an opposite side of the rotational torque reducing mechanism relative to the rotating member.

4. The stabilizer control device according to claim 1, wherein the clutch mechanism comprises a first rotating member fixed to the hollow member and arranged adjacent to the rotational torque reducing mechanism, a second rotating member fixed to the hollow member so as to be arranged oppositely and with a predetermined distance from the rotational torque reducing mechanism relative to the first rotating member, a first electromagnetic drive mechanism for frictionally engaging a first contact member relative to the first rotating member and disengaging the first contact member from the first rotating member, and a second electromagnetic drive mechanism for frictionally engaging a second contact member relative to the second rotating member and disengaging the second contact member from the second rotating member, and the first and second electromagnetic drive mechanisms are fixed between the first and second rotating members within the housing.

5. The stabilizer control device according to claim 1, wherein the rotational torque reducing mechanism includes a harmonic drive gear mechanism.

6. The stabilizer control device according to claim 1, wherein the rotational torque reducing mechanism includes a paradox planetary gear mechanism.

* * * * *